H. ABBOTT.

TIME PRINTING MECHANISM.

APPLICATION FILED MAY 29, 1908.

Reissued July 22, 1913.

13,597.

7 SHEETS—SHEET 1.

Witnesses:

Jas. E. Hutchinson:

Anna Newcomb

Inventor:

Henry Abbott,

By Prindle and Wright Attorneys.

Figure 3:
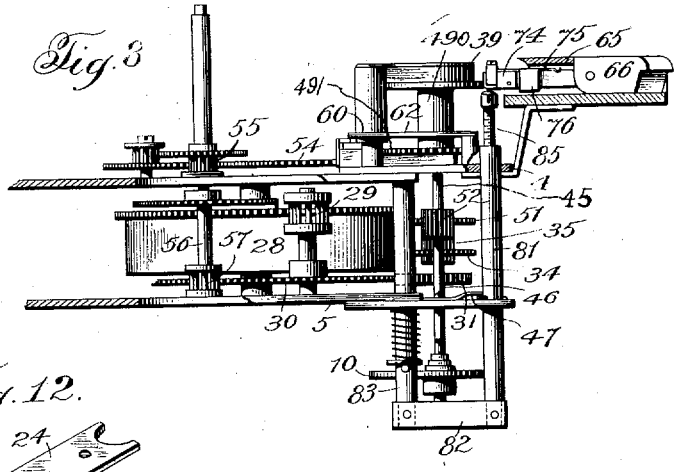

H. ABBOTT.
TIME PRINTING MECHANISM.
APPLICATION FILED MAY 29, 1908.
Reissued July 22, 1913.
13,597.
7 SHEETS—SHEET 2.
Fig. 3.a
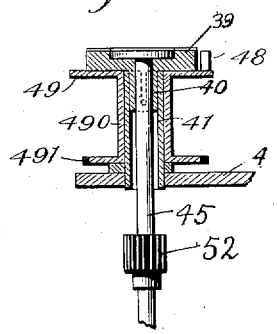
Fig. 3.
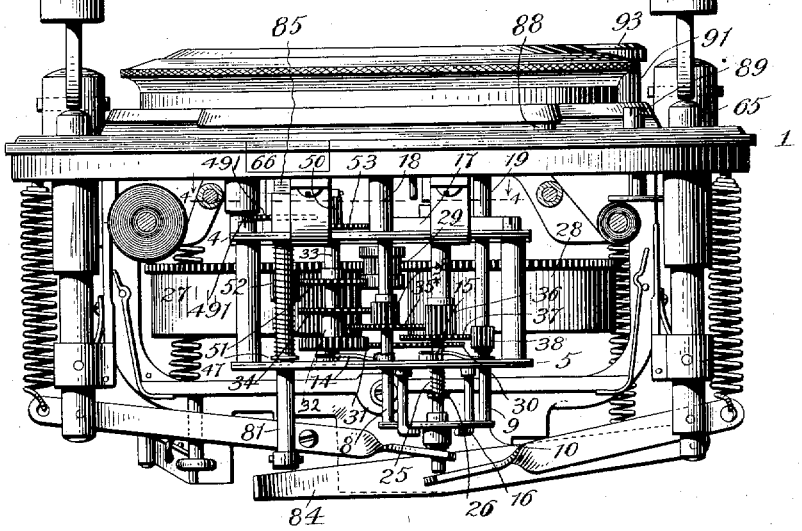
Witnesses:
Jas. E. Hutchinson:
Chas. Newcomb
Inventor:
Henry Abbott,
By Prindle and Wright. Attorneys

H. ABBOTT.

TIME PRINTING MECHANISM.

APPLICATION FILED MAY 29, 1908.

Reissued July 22, 1913.

13,597.

7 SHEETS—SHEET 3.

Witnesses:

Jas. E. Hutchinson.

Anna Nuscont

Inventor:

Henry Abbott,

By Prindle and Wright Attorneys

H. ABBOTT.

TIME PRINTING MECHANISM.

APPLICATION FILED MAY 29, 1908.

Reissued July 22, 1913.

13,597.

7 SHEETS—SHEET 4.

Inventor:

Witnesses:

Jas. E. Hutchinson:

Anna M. Newcomb

Henry Abbott,

By Prindle and Wright, Attorneys.

H. ABBOTT.

TIME PRINTING MECHANISM.

APPLICATION FILED MAY 29, 1908.

Reissued July 22, 1913.

13,597.

7 SHEETS—SHEET 5.

Witnesses:

Jas. E. Hutchinson:

Amos Newcomb

Inventor

Henry Abbott,

By Prindle and Wright.

Attorneys

H. ABBOTT.

TIME PRINTING MECHANISM.

APPLICATION FILED MAY 29, 1908.

Reissued July 22, 1913. 13,597.

7 SHEETS—SHEET 6.

Witnesses:

Jas E Hutchinson.

Thos Newcomb

Inventor:

Henry Abbott.

By Pindl and Bright, Attorneys

H. ABBOTT.

TIME PRINTING MECHANISM.

APPLICATION FILED MAY 29, 1908.

Reissued July 22, 1913.

13,597.

7 SHEETS—SHEET 7.

Witnesses:

Jas. E. Hutchinson:

Amos Newcomb

Inventor:

Henry Abbott,

By Prindle and Wright, Attorneys.

UNITED STATES PATENT OFFICE.

HENRY ABBOTT, OF NEW YORK, N. Y., ASSIGNOR TO CALCULAGRAPH COMPANY, OF NEW YORK, N. Y., A CORPORATION OF NEW JERSEY.

TIME-PRINTING MECHANISM.

13,597. Specification of Reissued Letters Patent. Reissued July 22, 1913.

Original No. 878,447, dated February 4, 1908, Serial No. 261,916. Application for reissue filed May 29, 1908. Serial No. 435,846.

*To all whom it may concern:*

Be it known that I, HENRY ABBOTT, of New York city, in the county of New York, and in the State of New York, have invented certain new and useful Improvements in Time-Printing Mechanisms, and do hereby declare that the following is a full, clear, and exact description thereof, reference being had to the accompanying drawings, in which—

Figure 1:
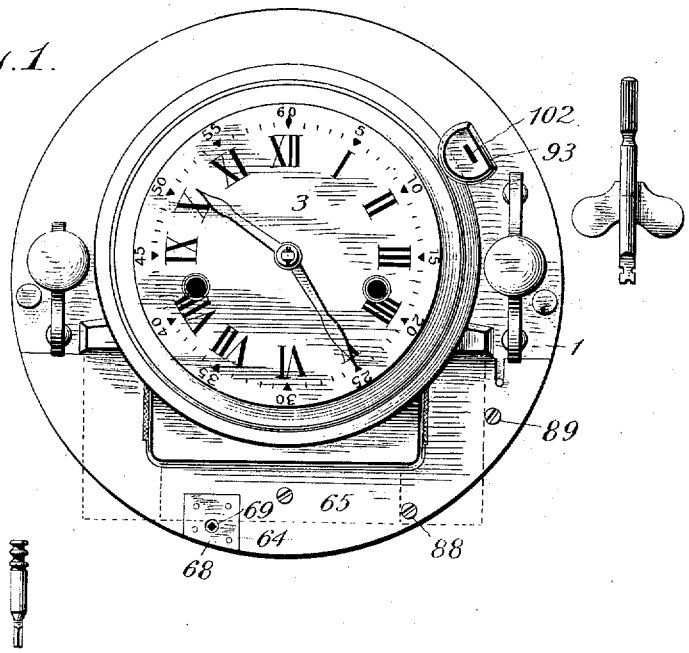
Figure 2:
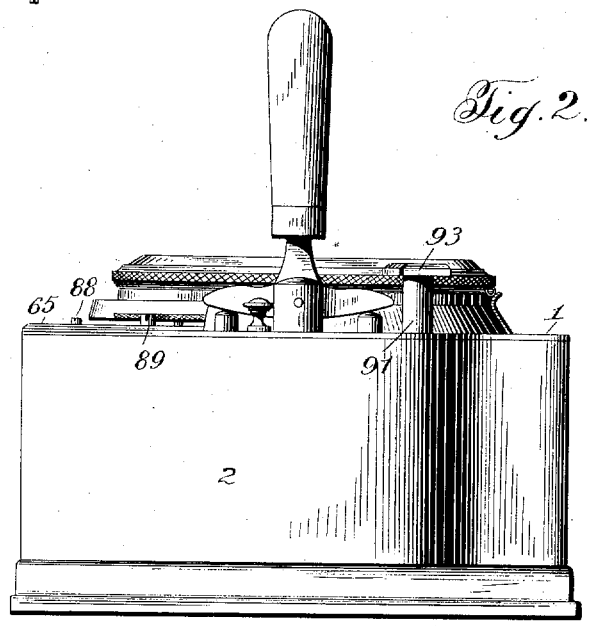
Figure 4:
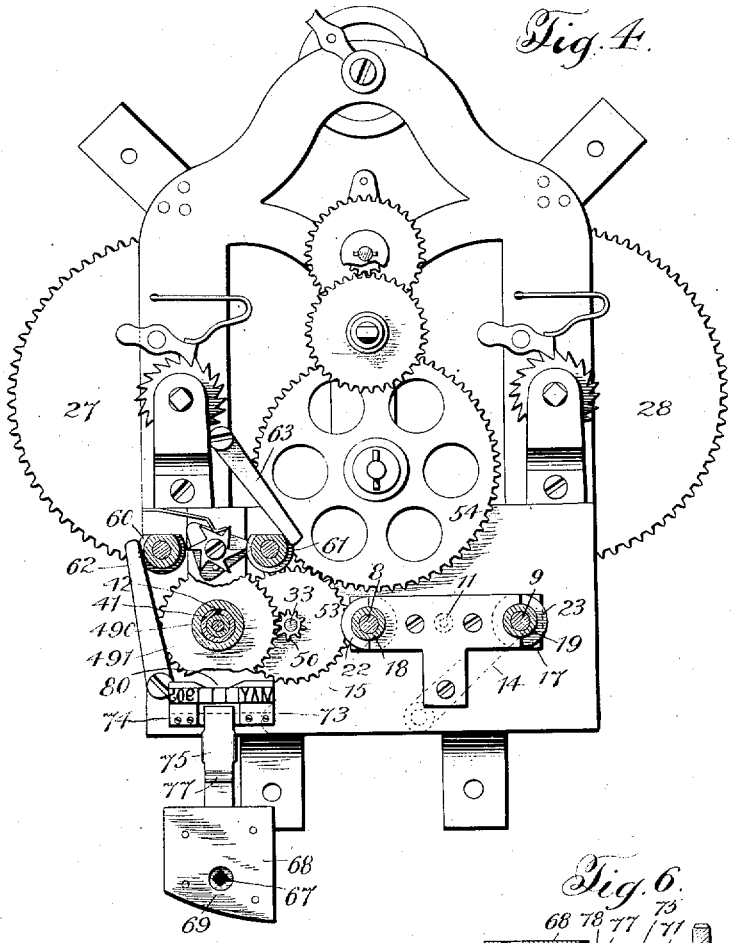
Figure 6:
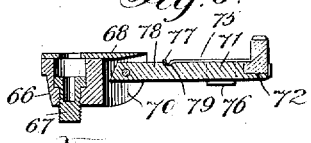
Figure 5:
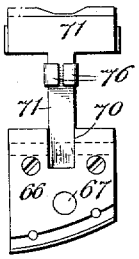
Figure 7:
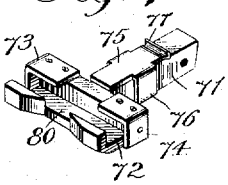
Figure 10:
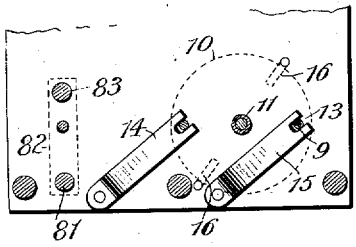
Figure 11:
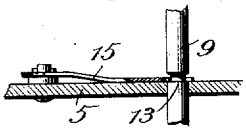
Figure 12:
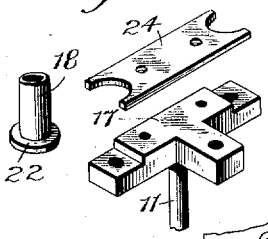
Figure 9:
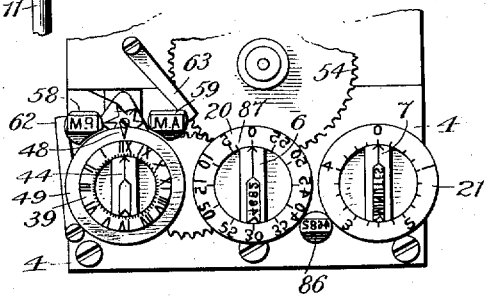
Figure 13:
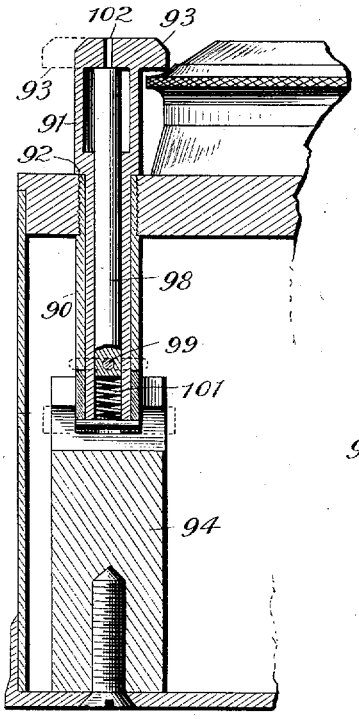
Figure 14:
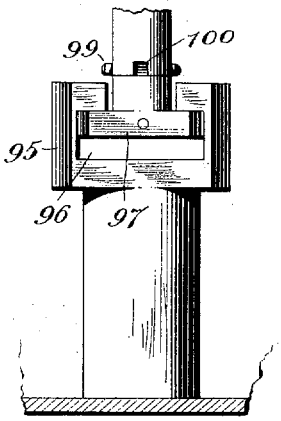
Figure 15:
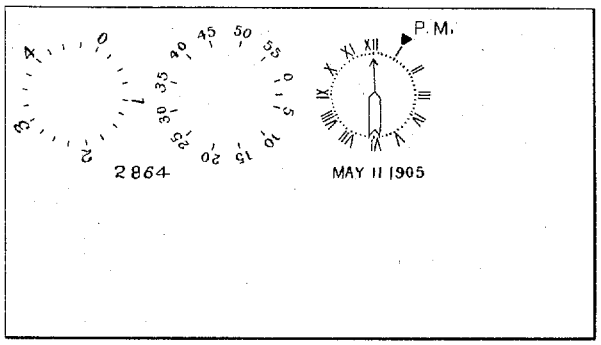
Figure 16:
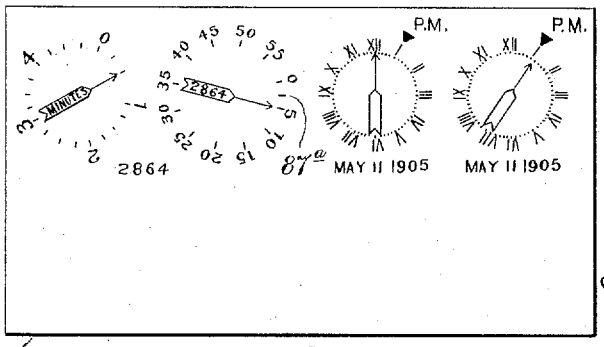
Figure 17:
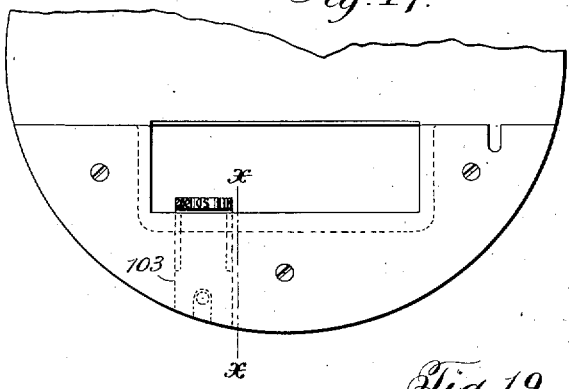
Figure 18:
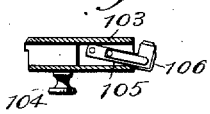
Figure 19:
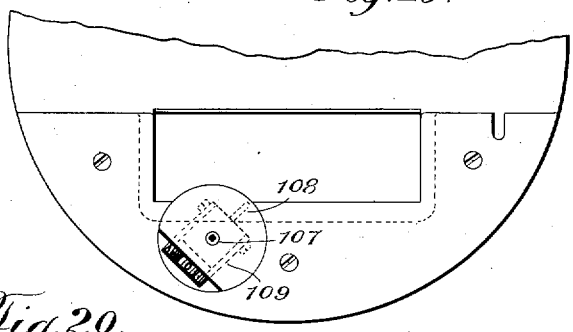
Figure 20:
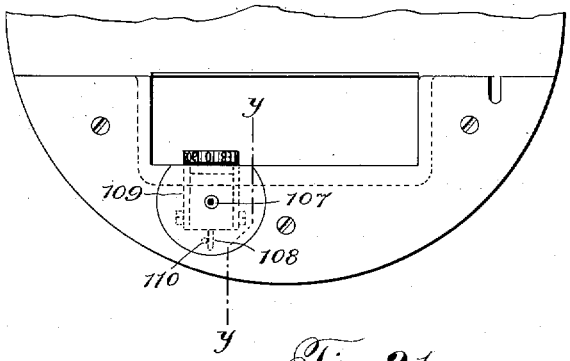
Figure 21:
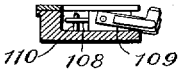
Figure 22:
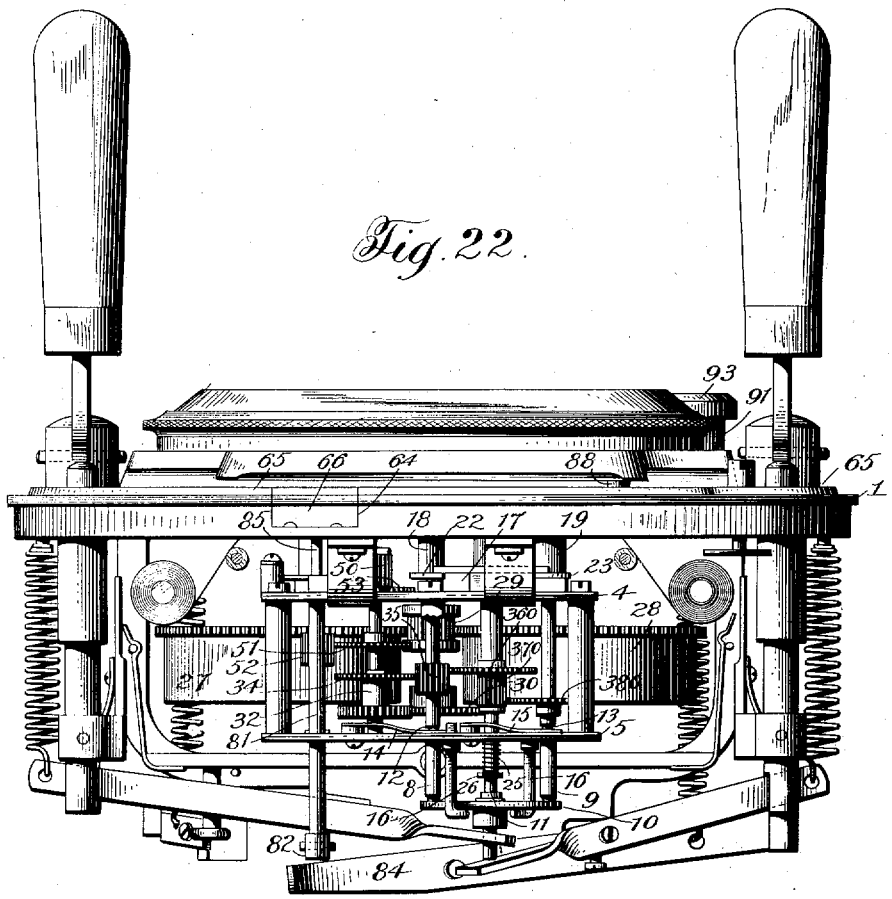
Figure 23:
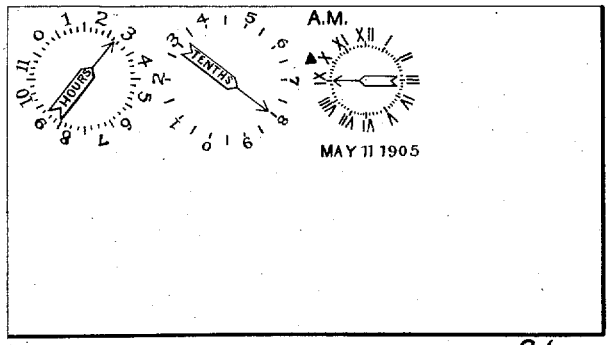

Figure 1 is a top plan view of a machine embodying my invention. Fig. 2 is a side elevation of Fig. 1. Fig. 3 is a side elevation of the machine in Fig. 1, removed from the case. Fig. 3[a] is a detail view of a section through one of the elapsed time dies. Fig. 4 is a horizontal sectional view taken on line 4—4 of Fig. 3. Figs. 5, 6 and 7 are, respectively, plan, vertical, sectional and perspective views of the dating device, illustrated in Fig. 4. Figs. 8 and 9 are, respectively, a partial, vertical, sectional view, and a partial plan view of the dies and the parts carrying them. Figs. 10 and 11 are, respectively, plan views and side elevations of the springs for retracting the dies. Fig. 12 is a perspective view of the parts for moving the elapsed time dial dies. Figs. 13 and 14 are, respectively, a vertical sectional view and a partial side elevation of the locking device. Figs. 15 and 16 are, respectively, views of a card having the initial and final imprints of the dies of Fig. 9 thereon. Figs. 17 and 18 are, respectively a plan view and a partial sectional view showing an alternative form of the dating device. Figs. 19 and 20 are plan views of the third form of dating device, the parts being shown in different positions. Fig. 21 is a partial sectional view of the dating device shown in Figs. 19 and 20. Fig. 22 is a view similar to Fig. 3, showing the machine geared for dies to record elapsed time in hours and tenths of an hour; and Fig. 23 is a view of a card adapted to be printed by the machine of Fig. 22.

The object of my invention has been to provide improvements in time-recording and printing mechanism, which, while especially adapted for use in the calculagraph which is the subject of Letters-Patent No. 583,320 granted upon my application May 25th, 1897, are also adapted for use in and by means of other time-recording mechanisms, which improvements will adapt the said instrument to be used either in a vertical or in a horizontal position; which will enable the time of day printing dies of said instrument to be set automatically in setting the hands, and that without disturbing in any manner the position of the elapsed time dies; which will enable the said instrument to make such a record that it can be told whether or not the initial and final elapsed time records were made upon the same machine; that will enable the said instrument to print a record by which it can be told, at a glance, whether or not a given period has been exceeded; that will enable the said instrument to print the time of day, both of the initial and final elapsed time records; that will enable the said instrument to print the date at the same time with the time-of-day record and to provide the said instrument with a lock, which will prevent access, either to the hands of the visible dial, or to the mechanism in the case of the machine, and to such ends, my invention consists in the improvements in time-recording mechanism hereinafter specified.

In carrying my invention into practice I provide an instrument which, as illustrated in the accompanying drawings, is, or may be, the same as the calculagraph of the said patent, except in the particulars hereinafter specified. Such instrument comprises a plate 1 that is seated in a cylindrical case 2, the mechanism of the instrument being attached to the said plate as in the instrument of the said patent. To the underside of the said plate is secured time-keeping mechanism for driving the various dies and the hands of the visible dial 3 on top of the plate, such mechanism comprising an upper plate 4, and a lower plate 5. The instrument, like that in the said patent, is adapted to record elapsed time in units of two denominations, and also the time of day. The elapsed time pointers, 6 and 7, are, respectively, mounted upon arbors 8 and 9, which are journaled in the said plates, the arbors resting upon a disk 10 that is loosely mounted upon an arbor 11. The arbors 8 and 9 are, respectively, provided with necks 12 and 13, which receive the forked ends of springs 14 and 15, that are fastened to the lower plate. The disk 10 is prevented from being forced downward below a certain level, by means of rods 16 depending from the said lower plate, as in the said patent. The necks or shoulders of the arbors 8 and 9 are formed in such a position that, when the plate 10 is resting on the rods 16, the lower shoulders of the said necks are below the level of the upper surface of said lower plate, so that said springs normally bear upon the said plate. This frees the arbors 8 and 9 from the friction of the said springs when the pointers are in their lower, normal and non-printing position, so that the time-train, to be described, does not have to overcome the friction of the said springs, except during the instant when printing is taking place. The arbor 11 carries at its upper end a cross-bar 17, upon which rest sleeves 18 and 19 which carry at their upper ends the cup-shaped dials 20 and 21. As in the case hereinbefore referred to, a pointer die and its dial die are rotatably connected by means of a pin that projects from the pointer die through a hole in the dial die. The sleeves 18 and 19 are provided with flanges 22 and 23 at their lower ends, and the bar 17 is provided with shoulders that overlie said flanges. The said shoulders may be formed in any desired manner. In the instance chosen for illustration, they are formed by securing a plate 24 on the upper face of the said bar. This construction insures that the dial dies shall descend with the arbor 11 when the latter is forced down as it is by a spring 25 interposed between a washer 26 on the said arbor and the lower plate 5.

With the construction above described, the pointer and dial dies are retracted from printing position by means of the springs, so that the instrument can be used in a position where the weight of such parts could not be utilized for such purpose; as, in a vertical position of the instrument. In order to drive the elapsed time dies, spring barrels 27 and 28 are mounted between the plates 4 and 5, and they mesh with a pinion 29 on an arbor carrying a gear 30 that meshes with a gear 31, the latter being secured to a sleeve 32 that is loosely mounted upon an arbor 33 journaled in the plates 4 and 5. The sleeve 32 also carries a gear 34 which meshes with a pinion 35 on the arbor 8 of the minutes pointer 6. The pinion 35 has fixed upon it a gear 35* which meshes with a pinion 36, loosely mounted upon the arbor 11, the said pinion 36 carrying a gear 37 that meshes with a pinion 38 on the arbor 9. It will be seen that the elapsed time dies are positively driven from the spring barrels, no yielding or friction gearing being interposed, so that the driving of the said dies is positive.

Time of day recording dies are provided as follows:—A dial die 39 has a cylindrical shank 40 that is slidably mounted within a hollow post 41, the latter being secured to the upper plate 4, the shank being provided with a pin 42 that engages a slot in the said post, to prevent rotation of the die while permitting its movement to printing position, as in the aforesaid patent. A minute pointer 44 revolves within the hour dial upon an arbor 45, the latter passing through the center of the stem of the hour dial and through the lower plate 5. The said arbor is, like the arbors 8 and 9, provided with a neck 46 that is engaged by a forked spring 47, the latter being secured upon the plate 5. The said spring serves to retract both the hour dial and pointer because the pointer engages the dial as the pointer is drawn down by the action of the spring on its arbor, and the arbor is relieved from friction when the said dies are in retracted position in the same manner as the arbors 8 and 9 are relieved from friction, due to the pressure of their springs. The hour hand 48 travels around outside the hour dial and is mounted upon a disk 49 at the upper end of a sleeve 490 surrounding the post 41, the lower end of the said sleeve being provided with a gear 491. Said gear meshes with a pinion 50 on the upper end of the arbor 33, the said arbor also carrying a gear 51 that meshes with a pinion 52 on the minute hand arbor. The arbor 33 carries a gear 53, by which it is driven by a gear 54 journaled on a stud on the upper face of the plate 4, which gear meshes with the cannon pinion 55, the latter being, as usual, frictionally mounted upon the center arbor 56, which arbor carries the hands of the visible dial. The center arbor carries a pinion 57 that meshes with the gear 30. It will be seen that the time of day dies are driven from the cannon pinion and that they are set whenever the hands of the visible dial are set. It will also be seen that the friction gearing allowing such setting is not interposed between the elapsed time dies and the springs, and that the setting of the time of day dies, consequently, cannot disturb the elapsed time dies. The a. m. and p. m. dies numbered, respectively, 58 and 59, together with their operating mechanism, are constructed as in the aforesaid patent, except that each of said dies is provided with a groove 60 and 61 respectively, such grooves being engaged by flat springs 62 and 63, respectively, that are mounted upon the top plate 4, the office of the said springs being to retract the said dies after the printing operation.

In order to print the date of a record, and without increasing the number of handles, or the number of movements necessary to operate the machine, I provide the following mechanism:—A slot 64 is formed in the top plate 1, said slot being partly covered by a plate 65 upon which the card rests when being printed. A block 66 is mounted in the said slot and fills the uncovered portion thereof, the said block being secured in place by a screw 67 that is mounted in a recess in the said block, the said screw being covered by a plate 68 the said plate having a hole 69 for access to the screw. The block 66 has a slot 70, in which is pivoted one end of a T-shape type-carrying bar 71. The latter is provided with a slot 72, which is adapted to receive type, and particularly logotype.

The slot 72 is covered at each end by plates 73 and 74, respectively, the plates serving to prevent the removal or escape of logotype at such points. Between the said cover plates the logotype can be removed, and when the central logotype is removed those at the end of said slot may be moved to a central position and removed. To prevent removal of the central logotype, a clip 75 is mounted on the shank of the type-carrying bar, as by having arms 76 bent around the said shank. A lip 77 is bent up on the clip to enable it to be moved, and a bend 78 is formed at the base of the said lip, the said bend being adapted to engage a groove 79 in the said shank to hold the clip in locked position. The central portion of the outer wall of the slot in the type-carrying bar is removed at 80, so that the central logotype may be readily grasped by the fingers. The type-carrying bar extends over a rod 81 that is mounted in a cross-bar 82 secured to the time of day printing bar 83, so that, when the latter is raised by the lever 84, the type-carrying bar of the dating dies will, also, be raised.

In order to adjust the travel of the dating dies, a screw 85 is mounted in the upper end of the bar 82 and adjustment of such screw serves to regulate the pressure upon the dating dies.

In order to enable it to be determined whether or not the initial and final elapsed time imprints were made upon the same instrument, a die 86 is mounted upon the lifting bar of the elapsed time dial dies, said die having engraved upon it the number of the machine. The same number is also engraved upon one of the elapsed time pointer dies. By this construction, when the elapsed time dials are printed, the number on the die 86 is printed, and when the pointers are printed the same number is again printed, and, by comparing the impressions of the two numbers it can be seen whether or not both initial and final imprints were made on the same machine.

In order that it may be seen, at a glance, whether or not a given period has been exceeded, as, for instance, whether or not a telephone message has exceeded the initial period for which a fixed charge is made, and, therefore, whether or not it is subject to an excess charge, I provide a die 87 on the dial die within the circle of graduations, and such die makes a mark 87[a], in the record, Fig. 16. For instance, if the initial period, before mentioned, is three minutes, the said mark is placed three minutes ahead of the pointer position, the pointer always being in juxtaposition to the zero of the scale, as in the machine of the said patent. By simply observing whether or not the pointer imprint is earlier or later than the mark 87, it can be told whether or not the initial period has been exceeded and, therefore, whether or not the message is subject to an excess charge. As an example, if, the pointer mark is earlier than the three minute mark 87[a], it is known that the initial period has not been exceeded, and, therefore, that there is no excess charge. This is all the information that is ordinarily wanted where the initial period has not been exceeded, it being immaterial what the length of a message might be, so long as it is not subject to an excess charge. If the pointer imprint is in line with the three-minute mark 87[a], it is evident, at a glance that the initial period has just been used. If the pointer imprint is beyond the three-minute mark 87, it is evident, at a glance, that the message is subject to an excess charge, and the length of the message is then accurately read upon the minute dial.

It is sometimes desirable to be able to record both the time of day of the beginning of an operation and the time of day of its completion, together with the time elapsing during the interval. In order to be able to make such a record I provide card stops 88 and 89 for the edge of the card, the said stops in the instance chosen for illustration, being of different heights and being in the form of screws. At the initial imprint of the time of day dies, and, also of the elapsed time dies, the card is placed against the lower screw 88. When the final elapsed time imprint is made, the card is again placed against the same screw. In order to print the time of day of the final imprint, however, the card is then shifted against the screw 89, which, exposes a fresh surface to the time of day dies, and the latter alone are imprinted by a backward movement of the right-hand lever.

To prevent unauthorized access, either to the hands of the visible dial, or to the mechanism of the machine, a lock is provided as follows: A sleeve 90 is secured in a hole in the top plate of the machine in any desired manner, as by being threaded into such hole. A second sleeve 91 is mounted within the sleeve 90 and is provided with a shoulder 92 that rests on the upper surface of the top plate. The sleeve 90 is provided with an eccentric disk 93, which disk, when turned toward the clock dial, projects over the bezel thereof, but which disk, when turned in the opposite direction, allows the bezel to swing. A post 94 is secured to the bottom of the casing in line with the sleeves 90 and 91. The said post has a head 95 at its upper end, which is provided with a T-shaped slot 96. The lower end of the sleeve 92 has a T-head or cross-bar 97, which is adapted to engage the T-shaped slot 96 when the disk 93 is in position to engage the bezel but such head, when the said disk is in an unlocked position, is free to be drawn up out of the T-shaped slot. In order to lock the sleeve 91 from rotation, a bolt 98 is mounted within such sleeve, and is provided with a cross-pin 99, that is adapted to engage with notches 100 in the lower end of the sleeve 90. A spring 101 within the sleeve 91 normally raises the pin. A slot 102 is formed in the disk 93 to permit a key to reach the bolt 98 to disengage the pin 99 from the notches 100, so that the sleeve 91 can be turned.

The form of dating device illustrated in Figs. 17 and 18 consists of a slide 103, which is adapted to be received in a slot on the underside of the top plate of the machine when the movement is out of the case, the slide being secured in position by a thumb-screw 104. Arms 105 are pivoted to the sides of the said slide and carry at their forward ends a holder 106 for the logotype, the latter being held in place by springs 106 secured to the said arms.

The form of dating device, illustrated in Figs. 19 to 21 is the same as that illustrated in Figs. 17 and 18, except that instead of being mounted on a slide, the parts are swiveled in a circular recess beneath the top plate, squared hole 107 being provided for a squared key to swing the parts from the printing position illustrated in Fig. 20 to a position illustrated in Fig. 19 in which the type are exposed through an opening in the top plate of the machine so that they may be changed. A pin 108 on the swiveled plate 109 is adapted to engage a stop 110 when the dating device is in printing position.

By the term "elapsed time dies" as used throughout the specification and claims is meant dies adapted to record the measure of the interval of time as distinguished from the time of day at the beginning or close of such interval.

It is obvious that various changes can be made in the above illustrated constructions within the spirit of my invention. For instance, by simply changing the gearing for driving the elapsed time dies, as illustrated in Fig. 22 a record can be made as illustrated in Fig. 23 which reads in hours and tenths of an hour instead of hours and minutes. The dividing of the hour into decimals facilitates the calculation of the cost of the operation in dollars and cents, or other decimal form of money. The parts in Fig. 22 are identical with those in Fig. 3, which are correspondingly numbered with the following exceptions: The gear 35 of Fig. 3 is omitted and the pinions 36 and 38 and gear 37 of Fig. 3 are replaced respectively by the gears 360 and 380 and the pinion 370 of Fig. 21. This gives the proper rate of speed to the die recording the fractions of an hour in decimals.

Having thus described my invention, what I claim is:

1. In a time printing device the combination of a die for recording time, mechanism for rotating said die, means to advance said die for printing and means for retracting said die, said last mentioned means consisting of springs, and means whereby the moving parts are relieved from the pressure of said springs when the die is in a retracted position.

2. In a time-printing device, the combination of a rotatable die, a spring motor for rotating said die, means for advancing said die for printing, springs for retracting said die, and stops to prevent movement of said springs to the full limit of the retracting movement of said die.

3. In a time-printing device, the combination of an arbor carrying a printing die, a spring motor for rotating said arbor, a spring adapted to engage a shoulder on said arbor for retracting the die, and a stop to prevent movement of said spring to the limit of the retracting movement of the die.

4. In a time-printing device, the combination of an arbor carrying a printing die, a spring motor adapted to rotate said arbor, a forked spring adapted to engage a neck on said arbor for retracting said die, and a stop against which said spring is adapted to contact before said arbor has reached the limit of its retracting movement.

5. In a time-printing device, the combination of a rotatable printing die, a sleeve by which said die is carried, a collar on said sleeve, and a part adapted to engage both sides of said collar for printing and retracting said die.

6. In a time-printing device, the combination of concentric, rotatable printing dies, an arbor carrying the inner of said dies, a sleeve carrying the outer of said dies, said sleeve being provided with a collar, and a bar adapted to engage both sides of said collar for printing and retracting said outer die, means for printing said inner die, and means for rotating said dies.

7. In a time-printing device, the combination of concentric printing dies, and arbor carrying the inner of said dies, a sleeve carrying the outer of said dies, said sleeve being provided with a collar, a bar adapted to engage the under surface of said collar, a plate on said bar adapted to engage the opposite surface of said collar, a forked spring adapted to engage a neck in said arbor, and a stop adapted to prevent movement of said spring to the limit of the retracting movement of said arbor.

8. In a time-printing device, the combination of elapsed time dies, time of day dies, a motor for rotating said dies at a uniform velocity, a visible dial, and gearing positively connecting the time of day dies and dial hands, but not positively connected with the elapsed time dies, whereby said time of day dies and the dial hands may be simultaneously set without disturbing said elapsed time dies.

9. In a time printing device, the combination of time of day dies, elapsed time dies, a single motor for driving both sets of dies, a visible dial, gearing positively connecting the hands of the visible dial with the time of day dies, and friction gearing connecting said first mentioned gearing with said motor whereby the time-of-day dies and the dial hands may be simultaneously set without disturbing said elapsed time dies.

10. In a time-printing device, the combination of time of day dies, elapsed time dies, a single motor for driving both sets of dies, a visible dial, gearing positively connecting the hands of the visible dial with the time of day dies, friction gearing connecting said first mentioned gearing with said motor, and gearing positively connecting said elapsed time dies with said motor whereby the time-of-day dies and the dial hands may be simultaneously set without disturbing said elapsed time dies.

11. In a time-printing device, the combination of elapsed time dies, time of day dies, a single motor for driving both sets of dies, a visible dial, gearing connecting the hands of said visible dial with said motor, said gearing comprising a cannon pinion, and gearing positively connecting said cannon pinion with said time of day dies.

12. In a time-printing device, the combination of two sets of time-recording dies, a motor, an escapement, a train of gearing connecting the motor and the escapement, gearing for driving one of said sets of dies from said train, and independent gearing for driving the other of said sets of dies from said train.

13. In a time-printing device, the combination of time of day dies, elapsed time dies, a clock mechanism, and independent sets of gearing connecting said time of day dies and said elapsed time dies with different members of the clock-train.

14. In a time-printing device, the combination of two sets of time recording dies, a motor, an escapement, a train of gearing connecting said motor and escapement, gearing for driving one of said sets of dies from a slow moving gear of said train, and gearing for driving the other of said sets of dies from a fast moving gear of said train.

15. In an elapsed-time recording device, the combination of dies for making the initial imprint, dies for making the final imprint, and two corresponding sets of characters one of which is adapted to be printed with the initial dies, and the other of which is adapted to be printed with the final dies, whereby it can be told whether or not the initial and final imprints were made upon the same machine.

16. In an elapsed-time printing machine, the combination of zero and pointer dies rotating in juxtaposition, means whereby they may be separately printed, and two corresponding sets of characters, one of which is adapted to be printed with said pointer die, and the other of which with said zero die.

17. In a machine for measuring and recording intervals of time, the combination of a rotatable pointer die, a motor for rotating said die at a uniform velocity, a scale die for printing a scale to measure the rotation of said first-mentioned die during the period to be measured, a special mark carried by said rotating pointer die not forming a part of any regular series of marks on said scale, for indicating whether or not the period to be measured has exceeded a predetermined fixed amount, and means for printing from said dies, said means including guides for positioning a card.

18. In a machine for measuring and recording intervals of time, the combination of the rotatable pointer die, a motor for rotating said die at a uniform velocity, a scale die for printing a scale to measure the rotation of said first-mentioned die during the period to be measured, a special mark carried by said rotating die and different from any other mark of the same unit-value on said scale for indicating whether or not the period to be measured has exceeded a predetermined fixed amount, and means for printing from said dies, said means including guides for positioning a card.

19. In a machine for measuring and recording intervals of time, the combination of a rotatable pointer die, means for rotating said die at a uniform velocity, a die for making a series of equidistant marks for measuring the arc traversed by said pointer die during a given period, a special mark not forming a part of any regular series of marks on said scale, said mark being carried by said rotatable die at a distance in advance of said pointer different from the distance between adjacent marks on said scale, whereby to indicate whether or not the period to be measured has exceeded a predetermined fixed amount, and means for printing from said dies, said means including guides for positioning a card.

20. In a machine for measuring and recording the duration of telephone messages, the combination of the motor, dies so operated by said motor as to be capable of measuring and recording the length of time consumed by said message, an additional die for indicating whether or not said time exceeded a fixed initial period and means for printing from said dies, said means including guides for positioning a card.

21. In a machine for measuring and recording intervals of time, the combination of a rotatable pointer die, a motor for rotating said die at a uniform velocity, a scale die for printing a scale to measure the rotation of said first-mentioned die during the period to be measured, said scale die having marks to print a series of units of the same value and a mark to indicate an initial period of a different length of time from any one of said units, for indicating whether or not the period to be measured has exceeded a predetermined fixed amount and means for printing said dies, said means including guides for positioning a card.

22. In a time printing device, the combination of time-recording dies, an operating handle for printing therefrom, a printing means supplemental to said dies, mounted independently thereof, and operating mechanism for said supplemental printing means actuated by said handle.

23. In a time printing device, the combination of elapsed time dies, time-of-day dies, and two guides, one of which is adapted to hold the card while printing the elapsed time and one of the time of day records, and the other of which is adapted for holding the card while printing a second record.

24. In a time printing device, the combination of time recording dies, a motor for rotating said dies, a stationary platen, means for moving said dies toward said platen, a holder for a line of type, said holder being pivoted to a stationary part of the machine, means whereby said holder may be removed from the machine by a movement transverse to the printing movement of said dies, said means for moving said dies toward the platen having a part adapted to engage said holder, and to carry said holder with said dies toward said platen.

25. In a time-printing device, the combination of an arm pivoted to the frame, front and rear type-holding walls carried by said arm, and a cover for the outer ends of the groove formed between said walls, the central portion of said groove being uncovered.

26. In a time-printing device, the combination of an arm pivoted to the frame, front and rear type-holding walls carried by said arm, a cover for the outer ends of the groove formed between said walls, the central portion of said groove being uncovered, the central portion of the outer wall being removed.

27. In a time-printing device, the combination of an arm pivoted to the frame, front and rear type-holding walls carried by said arm, a cover for the outer ends of the groove formed between said walls, the central portion of said groove being uncovered, the central portion of the outer wall being removed, and a spring clip adapted to be projected over or withdrawn from said central portion of said groove.

28. In a time-printing device, the combination of a casing, a time recording mechanism in said casing, a plate closing said casing, a platen carried by said plate and against which said mechanism is adapted to print, a slot formed in said plate, said slot opening through the top of said plate at its outer end and through the bottom of said plate at its inner end, a block adapted to be inserted in said slot and having a pivoted type-carrying arm adapted to be received in the inner portion of said slot, and means carried by a time-recording mechanism that is adapted to strike the under side of said arm and swing said arm toward said platen.

29. In a time-printing device, the combination of a casing, a time-recording mechanism in said casing, a plate closing said casing, a platen carried by said plate and against which said platen is adapted to print, a slot formed in said plate, said slot opening through the top of said plate at its outer end and through the bottom of said plate at its inner end, a block adapted to be inserted in said slot and having a pivoted type-carrying arm adapted to be received in the inner portion of said slot, and means carried by a time-recording mechanism that is adapted to strike the under side of said arm and swing said arm toward said platen, said means consisting of a vertically movable rod.

30. In a time-printing device, the combination of a casing, a time-recording mechanism in said casing, a plate closing said casing, a platen carried by said plate and against which said mechanism is adapted to print, a slot formed in said plate, said slot opening through the top of said plate at its outer end and through the bottom of said plate at its inner end, a block adapted to be received in the outer portion of said slot and having a type-carrying arm pivoted thereto, and means carried by said time-recording mechanism that is adapted to strike the under side of said arm and swing said arm toward said platen, and means for locking said block in said slot.

31. In a time-printing device, the combination of a casing, a time-recording mechanism in said casing, a plate closing said casing, a platen carried by said plate and against which said mechanism is adapted to print, a slot formed in said plate, said slot opening through the top of said plate at its outer end and through the bottom of said plate at its inner end, a block adapted to be inserted in said slot, and having a pivoted type carrying arm adapted to be received in the inner portion of said slot, and means carried by said time-recording mechanism that is adapted to strike the under side of said arm and swing said arm toward said platen, and means for locking said block in said slot, said means consisting of a screw seated in said block and adapted to be screwed into said plate, said screw being partially covered to prevent its entire withdrawal.

HENRY ABBOTT.

Witnesses:
EDWIN J. PRINDLE,
ANNA NEWCOMB.